United States Patent [19]
Pulido

[11] Patent Number: 5,802,237
[45] Date of Patent: Sep. 1, 1998

[54] OPTICAL FIBER ORGANIZER

[75] Inventor: Jacqueline J. Pulido, Austin, Tex.

[73] Assignee: Minnesota Mining and Manufacturing Company, St. Paul, Minn.

[21] Appl. No.: 844,554

[22] Filed: Apr. 18, 1997

[51] Int. Cl.[6] ................................................. G02B 6/00
[52] U.S. Cl. ........................................ 385/135; 385/137
[58] Field of Search ................................... 385/134–137

[56] References Cited

U.S. PATENT DOCUMENTS

| | | | |
|---|---|---|---|
| 4,373,776 | 2/1983 | Purdy | 385/135 |
| 4,595,255 | 6/1986 | Bhatt et al. | 385/135 |
| 4,722,585 | 2/1988 | Boyer | 385/135 |
| 4,765,708 | 8/1988 | Becker et al. | 385/135 |
| 4,900,121 | 2/1990 | Becker et al. | 385/135 |
| 5,131,066 | 7/1992 | Foss | 385/135 |
| 5,323,478 | 6/1994 | Milanowski et al. | 385/135 |
| 5,689,606 | 11/1997 | Hassan | 385/135 |
| 5,703,990 | 12/1997 | Robertson et al. | 385/135 |

Primary Examiner—Phan T. H. Palmer
Attorney, Agent, or Firm—Gerald F. Chernivec

[57] ABSTRACT

An optical fiber organizer for protecting and storing optical fibers includes a housing having a first level separated from a second level. A first fiber port is provided on the first level and a second fiber port is provided on the second level. Eccentric fiber channels are provided on the first level. Each channel has a passage for communicating fiber with an adjacent channel. The outermost one of the channels includes a passage for communicating fiber with the first fiber port on the first level. The innermost one of the channels includes a passage for communicating fiber to the second fiber port on the second level. A transition channel between the innermost and outermost channels provides an optical fiber splice device.

21 Claims, 4 Drawing Sheets

OPTICAL FIBER ORGANIZER

BACKGROUND

This invention relates generally to optical fiber organizers and more particularly to organizers which protect and store either single or ribbon optical fibers and protect and store splice devices.

Optical transmission and longevity of optical fiber are parameters influenced by fiber bend diameter and stresses induced on the fiber when the fiber is stored in an optical fiber organizer. One important factor is to avoid bending the optical fiber so as to exceed the minimum bend diameter. Excessive bending of an optical fiber can over stress the fiber and thus cause signal loss and/or decrease in life expectancy. These factors apply to both single and ribbon optical fibers. In effect, the organizer should not contribute to any signal loss or should not decrease the life expectancy of the optical fiber or the splice device.

The ease of initial installation of optical fiber and any associated splice devices, and the ease of future re-configurations and future installations are also very important parameters to consider. These parameters influence installation and re-configuration times and costs. Ultimately, these parameters influence the optical transmission and longevity of the optical fiber in instances where the installation or re-configuration is incorrectly completed.

Most often, optical fiber organizers are one component stored within a parent fiber device. Examples of parent fiber devices include splice housings, distribution boxes and cross-connect cabinets. Since the size of the organizer influences the size of the parent fiber device, it is advantageous to minimize the size of the organizer without compromising the integrity of the stored fiber or the optical transmission. This, in turn, will minimize the size of the fiber device and/or maximize the number of organizers within the parent fiber device.

Fiber management issues such as fiber cross-over have surfaced with the increasing use of ribbon fiber. Fiber cross-over occurs any time there is more than one fiber stored within an organizer and the paths of the fibers are forced to pass over one another. Most of the time for discrete fiber, cross-over occurs without any major effects to the fiber, organizer or ease of installation. For ribbon fiber, cross-over has a greater effect. At the ribbon fiber cross-over points, the fibers may have to be twisted to cross over each other; the organizer height may have to be increased to accommodate the cross-over points; or the installer must use an exact set of procedures when initially storing the ribbon fibers in the organizer. Even while cross-over problems can be avoided on the initial installation of the fibers by following an exact set of procedures, future re-configuring, re-splicing and retrieving slack fibers will inevitably result in ribbon cross-over.

Past optical fiber organizers have been too large to fit within a variety of parent fiber devices; have often been too cumbersome to install, re-configure or re-splice the fibers; have violated minimum fiber bend diameters; have created stresses within the stored fibers and/or have not addressed the ribbon fiber cross-over issue.

Therefore, what is needed is a small, compact organizer which is easy to install and reconfigure optical fibers and fiber interconnection devices, i.e., splice devices, which controls the minimum fiber bend diameter, which minimizes the stresses within the stored fibers, which allows storage of multiple loops of fibers which separately enter the organizer and which avoids cross-over of those fibers.

SUMMARY

One embodiment accordingly provides an optical fiber organizer for protecting and storing optical fibers. To this end, an optical fiber organizer comprises a housing having a first level separated from a second level. A first fiber port is provided on the first level and a second fiber port is provided on the second level. A plurality of fiber channels are formed on the first level. Each channel has a passage for communicating fiber with an adjacent channel. An outermost one of the channels includes a passage for communicating fiber with the first fiber port on the first level, and an innermost one of the channels includes a passage for communicating fiber to the second fiber port on the second level.

A principal advantage of this embodiment is that it provides an organizer which is small and compact and easy to install and reconfigure optical fibers and splice devices. Minimum fiber bend diameter is controlled which minimizes the stresses within the stored fibers. Ribbon fiber cross-over within the organizer is avoided by a plurality of nested, substantially circular fiber channels.

DETAILED DESCRIPTION OF THE PREFERRED EMBODIMENTS

Figure 1:
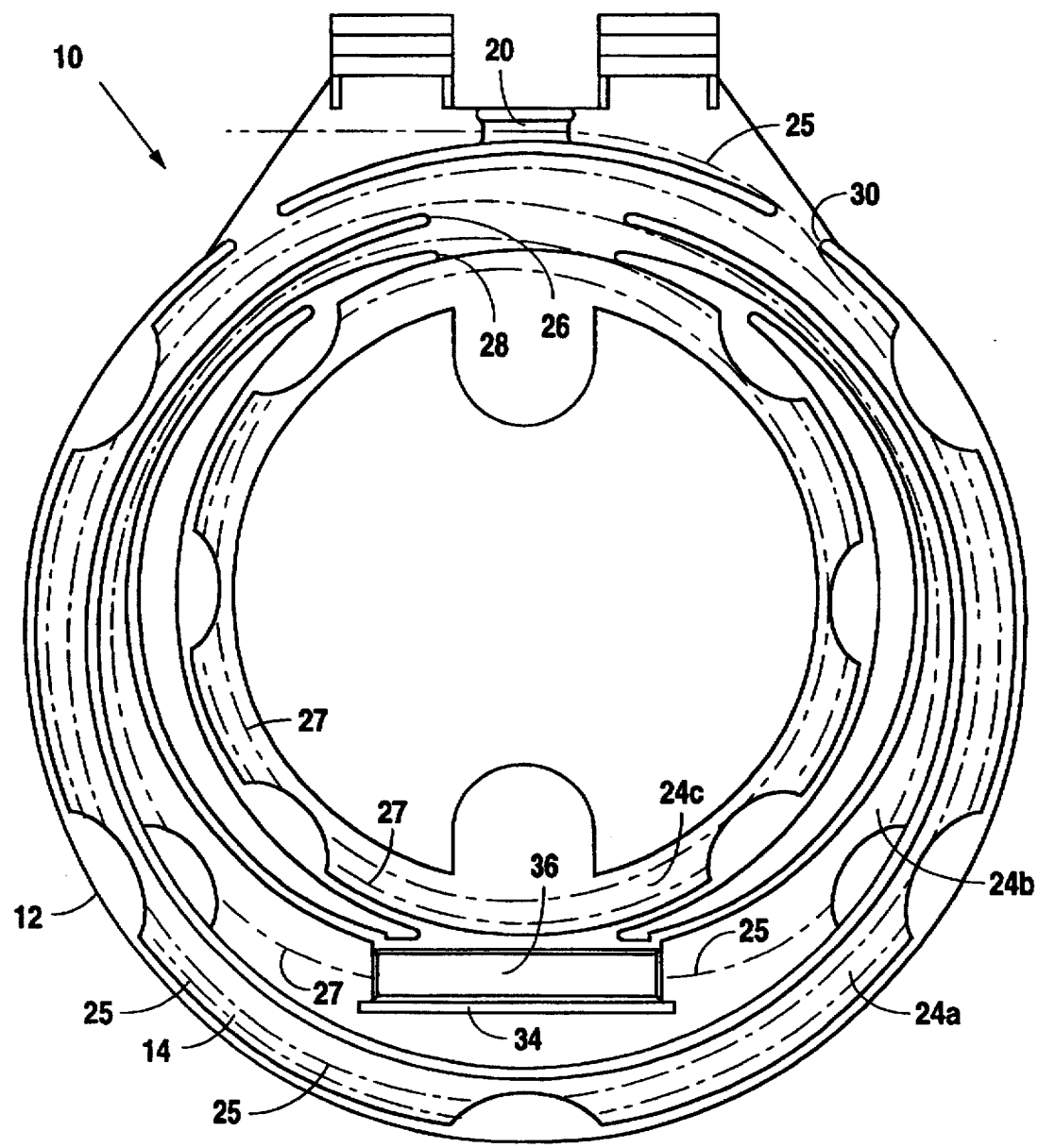
FIG. 1 is a plan view illustrating an embodiment of the upper level of the optical fiber organizer disclosed herein.
Figure 2:
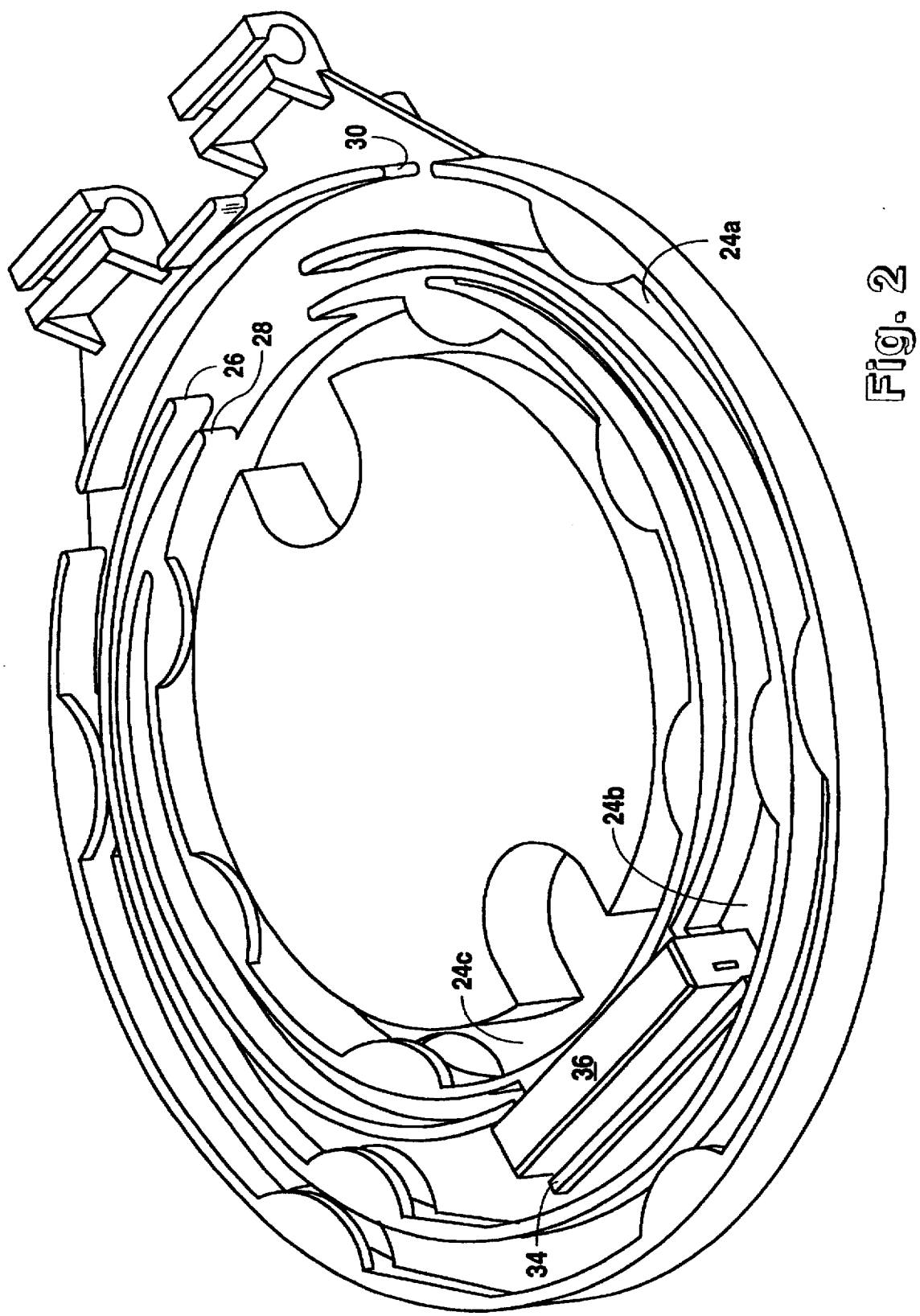
FIG. 2 is an isometric view illustrating an embodiment of the upper level of the organizer.
Figure 3:
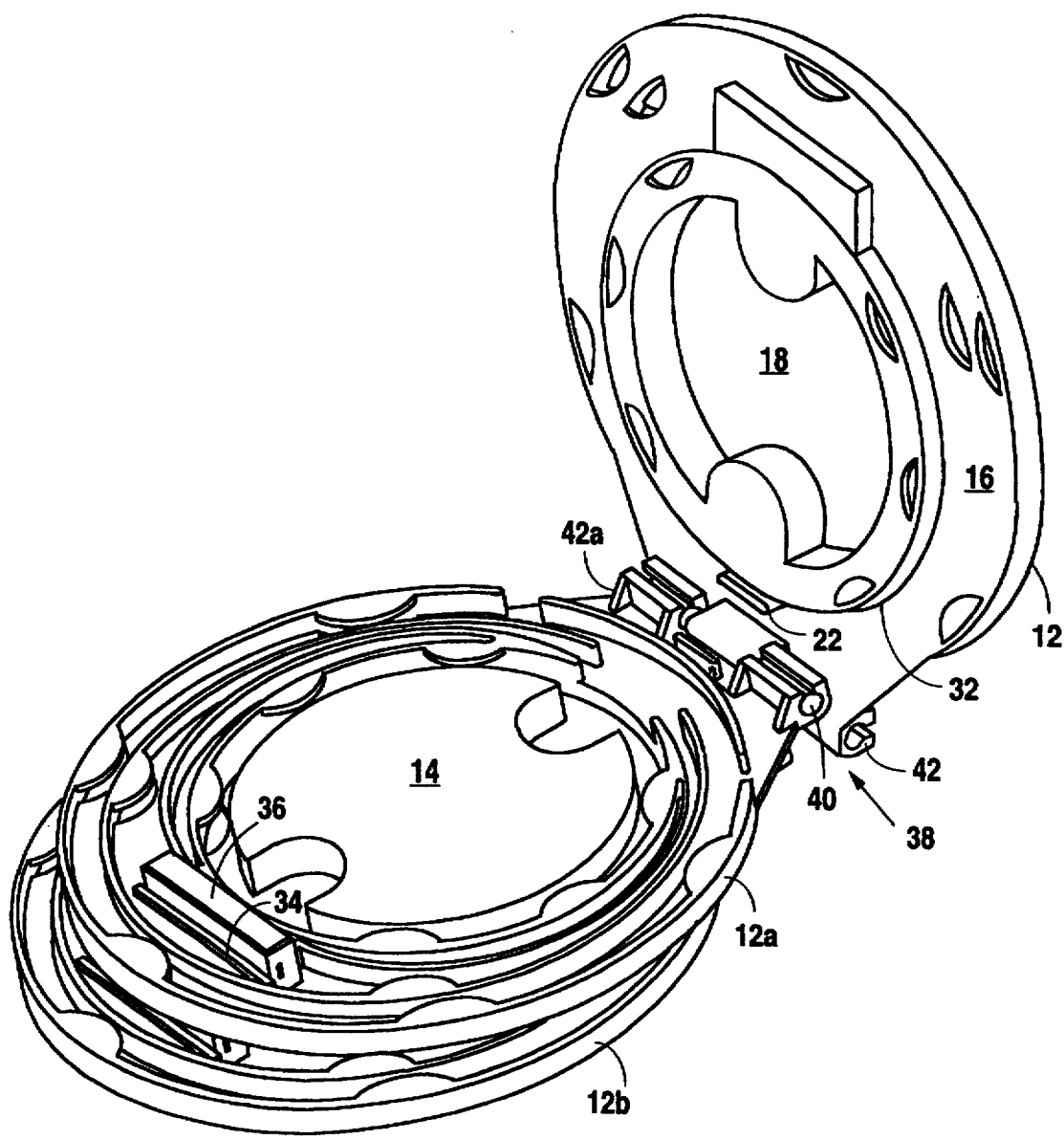
FIG. 3 is an isometric view illustrating an embodiment of a plurality of stacked organizers hinged together and exposing the upper and lower levels of the organizer.
Figure 4:
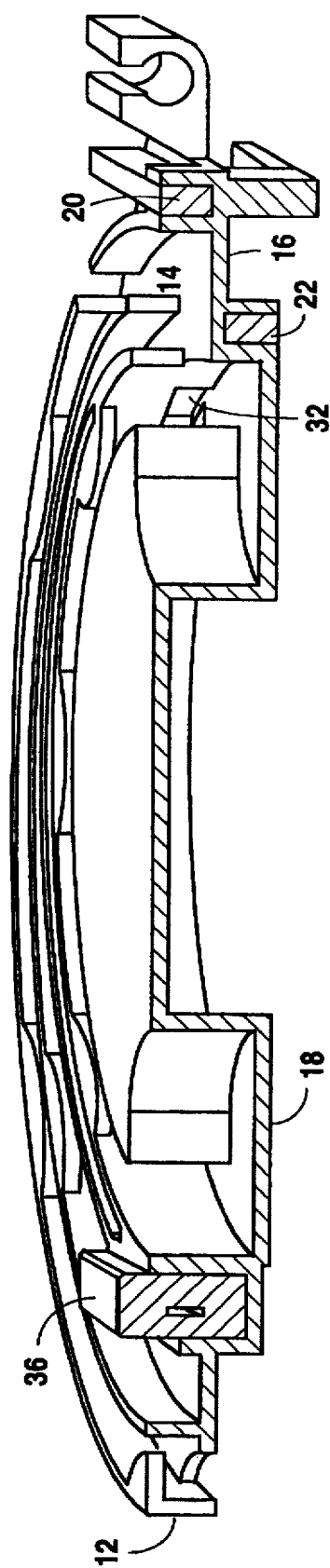
FIG. 4 is a partial isometric view illustrating a cut-a-way portion of an embodiment of the organizer.

Referring to FIG. 1, an optical fiber oganizer is generally designated 10 and includes a housing 12 having a first level 14 separated from a second level 16 FIGS. 3 and 4, by a floor member 18. A first fiber port 20, FIGS. 1 and 2, is provided on first level 14 and a second fiber port 22, FIG. 3, is provided on second level 16.

A plurality of nested, substantially circular fiber channels 24a, 24b and 24c are formed on first level 14, FIGS. 1 and 2. Each channel has a passage for communicating a pair of ribbon fibers 25, 27 with an adjacent channel. The channels are eccentrically arranged, but could be concentric. For example, an outermost one of the channels 24a includes a passage 26 for communicating fiber 25 with an adjacent transition channel 24b, and an innermost channel 24c includes a passage 28 for communicating fiber 27 with transition channel 24b. Also, outermost channel 24a includes a passage 30 for communicating fiber 25 with first fiber port 20 on first level 14. Innermost channel 24c includes a passage 32 for communicating fiber 27 with second fiber port 22, FIG. 3, on second level 16.

Transition channel 24b includes a receptacle means such as a retainer clip 34, FIGS. 1 and 2, for receiving and retaining a well-known optical fiber splice device 36 preferably in a press fit. However, other suitable retaining means may be used. A plurality of windings of fiber 25 are wound in outermost channel 24a and a plurality of windings of fiber 27 are wound in innermost channel 24c. Fibers 25 and 27 are spliced in splice device 36 within transition channel 24b.

A hinge device 38 is provided on each housing 12, FIG. 3, and includes a hinge pivot 40 and a hinge receptacle 42.

In this manner, hinge pivot 40 of housing 12 is received in hinge receptacle 42a of an adjacent stacked housing 12a. Hinge receptacle 42 of housing 12 is available for receiving a hinge pivot of another housing (not shown). Similarly, a hinge pivot of housing 12a is received in a hinge receptacle of an adjacent stacked housing 12b. As such, a plurality of stacked housings can be pivotally interconnected.

In operation, optical fiber 25 passes through port 20 and enters outermost channel 24a by means of passage 30 at first level 14. A plurality of windings of fiber 25 are wound around channel 24a. Fiber 25 then passes to transition channel 24b by means of passage 26. A single winding of fiber 25 is spliced in splice device 36. Optical fiber 27 passes through port 22 and enters innermost channel 24c by means of passage 32 at second level 16. A plurality of windings of fiber 27 are wound around channel 24c. Fiber 27 then passes to transition channel 24b by means of passage 28. A single winding of fiber 27 is spliced with fiber 25 in splice device 36.

Strain relief may be provided at ports 20 and 22 if desired. The number of windings in the innermost and outermost channels may vary substantially from the specific description given herein. Although a ribbon fiber 25 is shown and described, discrete fibers may be utilized in the same manner as disclosed for the ribbon fiber 25.

In accordance with the foregoing description, one embodiment provides an optical fiber organizer for protecting and storing optical fibers and comprises a housing having a first level separated from a second level, a first fiber port on the first level, a second fiber port on the second level, and a plurality of nested, substantially circular fiber channels formed on the first level, each channel having a passage for communicating fiber with an adjacent channel, an outermost one of the channels including a passage for communicating fiber with the first fiber port on the first level, and an innermost one of the channels including a passage for communicating fiber to the second fiber port on the second level. The optical fiber organizer further comprises a transition channel between the innermost and outermost channels, means mounted in the transition channel for interconnecting optical fiber, and receptacle means in the transition channel for receiving an optical fiber interconnection device, the interconnection device being secured in the receptacle means. A plurality of windings of the optical fiber are wound in the innermost and the outermost channels. The optical fiber may be a ribbon fiber or a discrete fiber. The housing includes hinge means for interconnecting with a plurality of other such housings so that the housing is stackable with the other housings.

Another embodiment provides a stackable optical fiber organizer for protecting and storing optical fibers and comprises a housing having a first level separated from a second level, a first fiber port on the first level and a second fiber port on the second level, and a plurality of eccentric fiber channels formed on the first level, each channel having a passage for communicating fiber with an adjacent channel, an outermost one of the channels including a passage for communicating fiber with the first fiber port on the first level, an innermost one of the channels including a passage for communicating fiber to the second fiber port on the second level, a transition channel between the innermost and outermost channels, and a fiber splice device mounted in the transition channel. The optical fiber organizer further comprises receptacle means in the transition channel for receiving the fiber splice device, the splice device being press fit in the receptacle means.

Still another embodiment provides a plurality of optical fiber organizers for protecting and storing optical fibers and comprises a plurality of stacked housings, each housing having a first level separated from a second level, a first fiber port on the first level and a second fiber port on the second level, a plurality of eccentric fiber channels formed on the first level, each channel having a passage for communicating fiber with an adjacent channel, an outermost one of the concentric channels including a passage for communicating fiber with the first fiber port on the first level, an innermost one of the channels including a passage for communicating fiber to the second fiber port on the second level, and hinge means for interconnecting the housings. The optical fiber organizers further comprise a transition channel between the innermost and outermost channels, means mounted in the transition channel for splicing optical fiber, and receptacle means in the transition channel for receiving an optical fiber splice device, the splice device being press fit in the receptacle means. The plurality of stacked housings are pivotably interconnected by the hinge means.

A further embodiment provides a method of protecting and storing optical fibers and comprises the steps of providing a housing having a first level separated from a second level, providing a first fiber port on the first level and a second fiber port on the second level, providing a plurality of nested fiber channels on the first level, threading a first optical fiber through the first port and through a passage into an outermost one of the channels, winding multiple loops of the first fiber in the outermost channel, threading the first fiber through a passage from the outermost channel into a transition channel, inserting the first fiber in a splice device provided in the transition channel, threading a second optical fiber through the second fiber port and through a passage into an innermost one of the channels, winding multiple loops of the second fiber in the innermost channel, threading the second fiber through a passage from the innermost channel into the transition channel, inserting the second fiber in the splice device, and splicing the first and second fibers together in the splice device.

As it can be seen, the principal advantages of this embodiment include storage of ribbon fibers but may also store discrete fibers. The organizer houses and protects both mechanical and fusion splice devices for the discrete and ribbon fibers. The organizer creates a small, compact housing for placement with parent devices which individually separates the fiber and its associated splice device from other fibers and splice devices, and separates fiber slack from incoming and outgoing fibers in two separate fiber slack channel areas. The housing self-hinges to adjacent housings for pivotally interconnecting the housings in stacked relationship. The channel diameters ensure that no fibers will go below the minimum fiber bend diameter and avoid ribbon fiber cross-over by providing two channels of fiber slack storage. The organizer also allows for easy removal of fiber slack for re-configuring and re-splicing fibers. Each organizer has a flat working surface to attach to various splicing rigs and fixtures. This minimizes the amount of slack fiber removed from the organizer for splicing and minimizes the chances of inducing significant stress within the stored fibers. The organizer also stores ribbon fibers without transitioning or twisting the fibers into the splicing devices.

Combining the features of this embodiment creates a small compact organizer which is easy to install and reconfigure optical fibers and fiber interconnection devices, i.e., splice devices, which controls the minimum fiber bend diameter, which minimizes the stresses within the stored fibers, which allows storage of multiple loops of fibers which separately enter the organizer and which avoids cross-over of those fibers.

Although an illustrative embodiment has been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiment disclosed herein.

What is claimed is:

1. An optical fiber organizer for protecting and storing optical fibers comprising:
   a housing having a first level separated from a second level;
   a first fiber port on the first level and a second fiber port on the second level; and
   a plurality of nested, substantially circular fiber channels formed on the first level, each channel having a passage for communicating fiber with an adjacent channel, an outermost one of the channels including a passage for communicating fiber with the first fiber port on the first level, and an innermost one of the channels including a passage for communicating fiber to the second fiber port on the second level.

2. The optical fiber organizer as defined in claim 1 further comprising a transition channel between the innermost and outermost channels.

3. The optical fiber organizer as defined in claim 2 further comprising means mounted in the transition channel for interconnecting optical fiber.

4. The optical fiber organizer as defined in claim 2 further comprising receptacle means in the transition channel for receiving an optical fiber interconnection device, the interconnection device being secured in the receptacle means.

5. The optical fiber organizer as defined in claim 1 wherein a plurality of windings of an optical fiber are wound in the innermost and the outermost channels.

6. The optical fiber organizer as defined in claim 5 wherein the optical fiber is a ribbon fiber.

7. The optical fiber organizer as defined in claim 1 wherein the housing includes hinge means for interconnecting with a plurality of other such housings.

8. The optical fiber organizer as defined in claim 1 wherein the housing is stackable with a plurality of other such housings.

9. A stackable optical fiber organizer for protecting and storing optical fibers comprising:
   a housing having a first level separated from a second level;
   a first fiber port on the first level and a second fiber port on the second level; and
   a plurality of eccentric fiber channels formed on the first level, each channel having a passage for communicating fiber with an adjacent channel, an outermost one of the channels including a passage for communicating fiber with the first fiber port on the first level, an innermost one of the channels including a passage for communicating fiber to the second fiber port on the second level, a transition channel between the innermost and outermost channels, and a fiber splice device mounted in the transition channel.

10. The optical fiber organizer as defined in claim 9 wherein a plurality of windings of an optical fiber are wound in the innermost and the outermost channels.

11. The optical fiber organizer as defined in claim 10 wherein the optical fiber is a ribbon fiber.

12. The optical fiber organizer as defined in claim 9 further comprising receptacle means in the transition channel for receiving the fiber splice device, the splice device being press fit in the receptacle means.

13. The optical fiber organizer as defined in claim 9 wherein the housing includes hinge means for interconnecting with a plurality of other such housings.

14. A plurality of optical fiber organizers for protecting and storing optical fibers comprising:
   a plurality of stacked housings, each housing having a first level separated from a second level, a first fiber port on the first level and a second fiber port on the second level, a plurality of eccentric fiber channels formed on the first level, each channel having a passage for communicating fiber with an adjacent channel, an outermost one of the concentric channels including a passage for communicating fiber with the first fiber port on the first level, an innermost one of the channels including a passage for communicating fiber to the second fiber port on the second level, and hinge means for interconnecting the housings.

15. The optical fiber organizers as defined in claim 14 further comprising a transition channel between the innermost and outermost channels.

16. The optical fiber organizers as defined in claim 15 further comprising means mounted in the transition channel for splicing optical fiber.

17. The optical fiber organizers as defined in claim 15 further comprising receptacle means in the transition channel for receiving an optical fiber splice device, the splice device being press fit in the receptacle means.

18. The optical fiber organizers as defined in claim 14 wherein a plurality of windings of an optical fiber are wound in the innermost and the outermost channels.

19. The optical fiber organizers as defined in claim 18 wherein the optical fiber is a ribbon fiber.

20. The optical fiber organizers as defined in claim 14 wherein the plurality of stacked housings are pivotably interconnected by the hinge means.

21. A method of protecting and storing optical fibers comprising the steps of:
   providing a housing having a first level separated from a second level;
   providing a first fiber port on the first level and a second fiber port on the second level;
   providing a plurality of nested fiber channels on the first level;
   threading a first optical fiber through the first port and through a passage into an outermost one of the channels;
   winding multiple loops of the first fiber in the outermost channel;
   threading the first fiber through a passage from the outermost channel into a transition channel;
   inserting the first fiber in a splice device provided in the transition channel;
   threading a second optical fiber through the second fiber port and through a passage into an innermost one of the channels;
   winding multiple loops of the second fiber in the innermost channel;
   threading the second fiber through a passage from the innermost channel into the transition channel;
   inserting the second fiber in the splice device; and
   splicing the first and second fibers together in the splice device.

* * * * *